United States Patent
Liu et al.

(10) Patent No.: US 11,919,422 B2
(45) Date of Patent: *Mar. 5, 2024

(54) VEHICLE BRAKING ENERGY RECOVERING METHOD AND APPARATUS

(71) Applicant: Huawei Technologies Co., Ltd., Shenzhen (CN)

(72) Inventors: Zuqi Liu, Hangzhou (CN); Jianfeng Zheng, Shenzhen (CN); Jinbo Ma, Shenzhen (CN); Jiajun Huang, Shenzhen (CN); Wei Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

This patent is subject to a terminal disclaimer.

(21) Appl. No.: 17/673,132

(22) Filed: Feb. 16, 2022

(65) Prior Publication Data

US 2022/0169119 A1 Jun. 2, 2022

Related U.S. Application Data

(63) Continuation of application No. 16/407,977, filed on May 9, 2019, now Pat. No. 11,260,756, which is a
(Continued)

(30) Foreign Application Priority Data

Nov. 9, 2016 (CN) .......................... 201610988900.0

(51) Int. Cl.
*B60L 7/18* (2006.01)
*B60L 7/10* (2006.01)
(Continued)

(52) U.S. Cl.
CPC ................. *B60L 7/18* (2013.01); *B60L 7/10* (2013.01); *B60L 7/20* (2013.01); *B60L 15/2009* (2013.01);
(Continued)

(58) Field of Classification Search
CPC ...... B60L 7/18; B60L 7/10; B60L 7/20; B60L 15/2009; B60L 2240/12; B60L 2240/16;
(Continued)

(56) References Cited

U.S. PATENT DOCUMENTS 9,437,110 B2 9/2016 Otake
2011/0118921 A1 5/2011 Park et al.
(Continued)

FOREIGN PATENT DOCUMENTS

CN 101332774 A 12/2008
CN 102069794 A 5/2011
(Continued)

*Primary Examiner* — Alan D Hutchinson
(74) *Attorney, Agent, or Firm* — Conley Rose, P.C.

(57) ABSTRACT

A vehicle braking energy recovering method includes obtaining current location information of a vehicle, determining a current road scenario based on the current location information of the vehicle, determining the current road scenario based on a mapping relationship between a road scenario and a weight, determining a safe distance and a safe speed of the vehicle based on the weight, determining a target torque based on the safe distance and the safe speed of the vehicle, and controlling, based on the target torque, a motor of the vehicle to recover braking energy.

20 Claims, 5 Drawing Sheets

Related U.S. Application Data continuation of application No. PCT/CN2016/112756, filed on Dec. 28, 2016.

(51) Int. Cl.
  *B60L 7/20* (2006.01)
  *B60L 15/20* (2006.01)
  *B60T 1/10* (2006.01)
  *G06Q 10/04* (2023.01)

(52) U.S. Cl.
  CPC ........... *B60T 1/10* (2013.01); *G06Q 10/04* (2013.01); *B60L 2240/12* (2013.01); *B60L 2240/16* (2013.01); *B60L 2240/423* (2013.01); *B60L 2240/68* (2013.01); *B60L 2240/70* (2013.01); *Y02T 10/72* (2013.01)

(58) Field of Classification Search
  CPC ......... B60L 2240/423; B60L 2240/68; B60L 2240/70; B60L 2240/421; B60L 15/20; B60L 2240/42; B60L 2240/642; B60T 1/10; G06Q 10/04; Y02T 10/72; Y02T 10/64; Y02T 90/16; B60Y 2200/91
  See application file for complete search history.

(56) References Cited

U.S. PATENT DOCUMENTS

| | | |
|---|---|---|
| 2014/0005879 A1 | 1/2014 | Poechmueller et al. |
| 2014/0285331 A1 | 9/2014 | Otake |
| 2015/0183433 A1 | 7/2015 | Suzuki |
| 2015/0298553 A1* | 10/2015 | Maiterth ............ B60L 7/14 701/71 |
| 2016/0052521 A1 | 2/2016 | Cho et al. |

FOREIGN PATENT DOCUMENTS

| | | |
|---|---|---|
| CN | 102717800 A | 10/2012 |
| CN | 102765388 A | 11/2012 |
| CN | 103236177 A | 8/2013 |
| CN | 103921786 A | 7/2014 |
| CN | 104742905 A | 7/2015 |
| CN | 103921795 A | 4/2016 |
| CN | 105528498 A | 4/2016 |
| CN | 103261855 A | 8/2016 |
| CN | 105857114 A | 8/2016 |
| CN | 105898231 A | 8/2016 |
| CN | 106043256 A | 10/2016 |
| DE | 102007054453 A1 | 5/2009 |
| DE | 112011101345 A5 | 1/2013 |
| EP | 2782082 A1 | 9/2014 |
| IN | 104554279 A | 4/2015 |
| JP | 2005149024 A | 6/2005 |
| JP | 2015104230 A | 6/2015 |
| JP | 2015123831 A | 7/2015 |
| KR | 20160079401 A | 7/2016 |
| WO | 2011128410 A1 | 10/2011 |
| WO | 2013073014 A1 | 5/2013 |
| WO | 2015087516 A2 | 6/2015 |
| WO | 2016094694 A1 | 6/2016 |

* cited by examiner

VEHICLE BRAKING ENERGY RECOVERING METHOD AND APPARATUS

CROSS-REFERENCE TO RELATED APPLICATIONS

This is a continuation of U.S. patent application Ser. No. 16/407,977 filed on May 9, 2019, which is a continuation of International Patent Application No. PCT/CN2016/112756 filed on Dec. 28, 2016, which claims priority to Chinese Patent Application No. 201610988900.0 filed on Nov. 9, 2016. All of the aforementioned patent applications are hereby incorporated by reference in their entireties.

TECHNICAL FIELD

This application relates to energy recovering technologies, in particular, to a vehicle braking energy recovering method and apparatus.

BACKGROUND

At present, air pollution is serious, smog is frequent, and wide attention is paid to environment protection. Therefore, development of electric vehicles (EVs) has drawn attention to various countries. However, a driving range is a greatest problem that hinders EV promotion.

Previously, a manner of improving EV energy utilization is usually used to resolve the driving range problem. For example, braking energy recovery may be used to improve EV energy utilization. FIG. 1 is a framework diagram of a vehicle braking energy recovery system in the prior art. As shown in FIG. 1, in existing EV braking energy recovering and control decision, an accelerator signal, a braking signal, and a clutch signal are obtained through identification of opening degrees of an acceleration pedal, a brake pedal, and a clutch pedal, and then based on a maximum allowed charging current and a battery state of charge (SOC), an entire vehicle controller computes a brake torque command based on a motor rotational speed, and controls the motor to perform energy feedback.

However, the existing braking energy recovering manner is passively recovering braking energy based on an operation performed by a driver on a pedal and statuses of a battery and a motor, resulting in a relatively low braking energy recovery rate.

SUMMARY

Embodiments of this application provide a vehicle braking energy recovering method and apparatus, to improve a braking energy recovery rate.

According to a first aspect, an embodiment of this application provides a vehicle braking energy recovering method, where the method includes obtaining current location information of a vehicle, determining a current road scenario based on the current location information of the vehicle, determining, based on a mapping relationship between a road scenario and a weight, a weight corresponding to the current road scenario, determining a safe distance and a safe speed of the vehicle based on the weight, determining a target torque based on the safe distance and the safe speed of the vehicle, and controlling, based on the target torque, a motor of the vehicle to recover braking energy.

According to the vehicle braking energy recovering method provided in the first aspect, the current location information of the vehicle is obtained, the current road scenario is determined based on the current location information of the vehicle, the weight corresponding to the current road scenario is determined based on the mapping relationship between a road scenario and a weight, the safe distance and the safe speed of the vehicle are determined based on the weight, then the target torque is determined based on the safe distance and the safe speed of the vehicle, and finally, the motor of the vehicle is controlled based on the target torque to recover the braking energy. The safe speed and the safe distance of the vehicle are determined based on the current road scenario of the vehicle, and then the target torque is determined for recovering the braking energy. In an embodiment, the road scenario is determined based on information perceived by the vehicle, and different weights are assigned to different road scenarios to calculate the safe distance and the safe speed, then determine a target deceleration, and allocate the torque, thereby improving a braking energy recovery rate.

In a possible design, the weight includes a safe distance weight and a safe speed weight, and the determining a safe distance and a safe speed of the vehicle based on the weight includes calculating the safe distance of the vehicle based on the safe distance weight of the vehicle, and calculating the safe speed of the vehicle based on the safe speed weight of the vehicle.

In the foregoing design, for a same scenario, the safe distance weight of the vehicle and the safe speed weight of the vehicle may be the same, or may be different.

In a possible design, before the calculating the safe distance of the vehicle based on the safe distance weight of the vehicle, the method further includes obtaining information perceived by the vehicle, and determining a first safe distance $L_1$ based on the information perceived by the vehicle, where $L_1$ is a relative distance between an obstacle and the vehicle, and obtaining information transmitted by an Internet of Vehicles, and determining a second safe distance $L_2$ based on the information transmitted by the Internet of Vehicles, where $L_2$ is a relative distance between an obstacle and the vehicle, and the calculating the safe distance of the vehicle based on the safe distance weight of the vehicle includes calculating the safe distance of the vehicle according to a formula $L_{safe}=\delta_{1i}*L_1+\delta_{2i}*L_2$, where $L_{safe}$ is the safe distance, and the safe distance weight includes two parameters, $\delta_{1i}$ and $\delta_{2i}$.

In the foregoing design, the obstacle includes a moving or static object, for example, includes an object such as another vehicle or a railing.

In a possible design, before the calculating the safe speed of the vehicle based on the safe speed weight of the vehicle, the method further includes obtaining information perceived by the vehicle, and determining a first safe speed $V_1$ based on the information perceived by the vehicle, where $V_1$ is a relative speed between an obstacle and the vehicle, and obtaining information transmitted by an Internet of Vehicles, and determining a second safe speed $V_2$ based on the information transmitted by the Internet of Vehicles, where $V_2$ is a relative speed between an obstacle and the vehicle, and the calculating the safe distance of the vehicle based on the safe distance weight of the vehicle includes calculating the safe speed of the vehicle according to a formula $V_{safe}=\delta_{1i}*V_1+\delta_{2i}*V_2$, where $V_{safe}$ is the safe speed, and the safe speed weight includes two parameters, $\delta_{1i}$ and $\delta_{2i}$.

In a possible design, before the calculating the safe distance of the vehicle based on the safe distance weight of the vehicle, the method further includes obtaining information perceived by the vehicle, and determining a first safe distance $L_1$ based on the information perceived by the vehicle, where $L_1$ is a relative distance between an obstacle and the vehicle, obtaining information transmitted by an Internet of Vehicles, and determining a second safe distance $L_2$ based on the information transmitted by the Internet of Vehicles, where $L_2$ is a relative distance between an obstacle and the vehicle, and obtaining road historical information that is stored in a cloud data center, and determining a third safe distance $L_3$ based on the road historical information that is stored in the cloud data center, where $L_3$ is a relative distance between an obstacle and the vehicle, and the calculating the safe distance of the vehicle based on the safe distance weight of the vehicle includes calculating the safe distance of the vehicle according to a formula $L_{safe}=\delta_{1i}*L_1+\delta_{2i}*L_2+\delta_{3i}*L_3$, where $L_{safe}$ is the safe distance, and the safe distance weight includes three parameters, $\delta_{1i}$, $\delta_{2i}$, and $\delta_{3i}$.

In a possible design, before the calculating the safe speed of the vehicle based on the safe speed weight of the vehicle, the method further includes obtaining information perceived by the vehicle, and determining a first safe speed $V_1$ based on the information perceived by the vehicle, where $V_1$ is a relative speed between an obstacle and the vehicle, obtaining information transmitted by an Internet of Vehicles, and determining a second safe speed $V_2$ based on the information transmitted by the Internet of Vehicles, where $V_2$ is a relative speed between the obstacle and the vehicle, and obtaining road historical information that is stored in a cloud data center, and determining a third safe speed $V_3$ based on the road historical information that is stored in the cloud data center, where $V_3$ a relative speed between an obstacle and the vehicle, and the calculating the safe speed of the vehicle based on the safe speed weight of the vehicle includes calculating the safe speed of the vehicle according to a formula $V_{safe}=\delta_{1i}*V_1+\delta_{2i}*V_2+\delta_{3i}*V_3$, where $V_{safe}$ is the safe speed, and the safe speed weight includes three parameters, $\delta_{1i}$, $\delta_{2i}$, and $\delta_{3i}$.

According to the vehicle braking energy recovering method provided in the foregoing possible designs, the safe distance and the safe speed of the vehicle may be calculated in different manners for different cases such that manners of calculating the safe distance and the safe speed are more flexible.

In a possible design, the determining the target torque based on the safe distance and the safe speed of the vehicle includes calculating a target deceleration based on a driving speed of the vehicle, the safe distance, and the safe speed, and determining the target torque based on the target deceleration.

In the foregoing possible design, the calculating a target deceleration based on a driving speed of the vehicle, the safe distance, and the safe speed includes calculating the target deceleration according to the following formula, $$a_{trg} = \frac{v_{safe}^2 - v^2}{2L_{safe}},$$

where $a_{trg}$ is the target deceleration, $V_{safe}$ is the safe speed, $L_{safe}$ is the safe distance, and v is the driving speed of the vehicle.

In the vehicle braking energy recovering method provided in the foregoing possible designs, the target deceleration is calculated based on the driving speed of the vehicle, the safe distance, and the safe speed, and the target torque is determined based on the target deceleration and a vehicle dynamics model. In this way, the target torque is calculated based on the target deceleration and by introducing the vehicle dynamics model, and therefore an objective of recovering braking energy based on overall economic considerations can be achieved.

In a possible design, the information transmitted by the Internet of Vehicles includes at least one of a road-allowed maximum speed, a road slope, a signal light status, a signal light distance, an average traffic speed of a current road, or a first congestion coefficient.

In a possible design, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data.

According to a second aspect, an embodiment of this application provides a vehicle braking energy recovering apparatus, where the apparatus includes an obtaining module, configured to obtain current location information of a vehicle, a determining module, configured to determine a current road scenario based on the current location information of the vehicle, where the determining module is further configured to determine, based on a mapping relationship between a road scenario and a weight, a weight corresponding to the current road scenario, the determining module is further configured to determine a safe distance and a safe speed of the vehicle based on the weight, and the determining module is further configured to determine the target torque based on the safe distance and the safe speed of the vehicle, and a control module, configured to control, based on the target torque, a motor of the vehicle to recover braking energy.

In a possible design, the weight includes a safe distance weight and a safe speed weight, and the determining module includes a first calculation unit, configured to calculate the safe distance of the vehicle based on the safe distance weight of the vehicle, and a second calculation unit, configured to calculate the safe speed of the vehicle based on the safe speed weight of the vehicle.

In a possible design, the obtaining module is further configured to obtain information perceived by the vehicle, the determining module is further configured to determine a first safe distance $L_1$ based on the information perceived by the vehicle, where $L_1$ is a relative distance between an obstacle and the vehicle, the obtaining module is further configured to obtain information transmitted by an Internet of Vehicles, the determining module is further configured to determine a second safe distance $L_2$ based on the information transmitted by the Internet of Vehicles, where $L_2$ is a relative distance between the obstacle and the vehicle, and the first calculation unit is configured to calculate the safe distance of the vehicle according to a formula $L_{safe}=\delta_{1i}*L_1+\delta_{2i}*L_2$, where $L_{safe}$ is the safe distance, and the safe distance weight includes two parameters, $\delta_{1i}$ and $\delta_{2i}$.

In a possible design, the obtaining module is further configured to obtain information perceived by the vehicle, the determining module is further configured to determine a first safe speed $V_1$ based on the information perceived by the vehicle, where $V_1$ is a relative speed between an obstacle and the vehicle, the obtaining module is further configured to obtain information transmitted by an Internet of Vehicles, the determining module is further configured to determine a second safe speed $V_2$ based on the information transmitted by the Internet of Vehicles, where $V_2$ is a relative speed between an obstacle and the vehicle, and the second calculation unit is configured to calculate the safe speed of the vehicle according to a formula $V_{safe}=\delta_{1i}*V_1+\delta_{2i}*V_2$, where $V_{safe}$ is the safe speed, and the safe speed weight includes two parameters, $\delta_{1i}$ and $\delta_{2i}$.

In a possible design, the obtaining module is further configured to obtain information perceived by the vehicle, the determining module is further configured to determine a first safe distance $L_1$ based on the information perceived by the vehicle, where $L_1$ is a relative distance between an obstacle and the vehicle, the obtaining module is further configured to obtain information transmitted by an Internet of Vehicles, the determining module is further configured to determine a second safe distance $L_2$ based on the information transmitted by the Internet of Vehicles, where $L_2$ is a relative distance between an obstacle and the vehicle, the obtaining module is further configured to obtain road historical information that is stored in a cloud data center, the determining module is further configured to determine a third safe distance $L_3$ based on the road historical information that is stored in the cloud data center, where $L_3$ is a relative distance between an obstacle and the vehicle, and the first calculation unit is configured to calculate the safe distance of the vehicle according to a formula $L_{safe}=\delta_{1i}*L_1+\delta_{2i}*L_2+\delta_{3i}*L_3$, where $L_{safe}$ is the safe distance, and the safe distance weight includes three parameters, $\delta_{1i}$, $\delta_{2i}$, $\delta_{3i}$.

In a possible design, the obtaining module is further configured to obtain information perceived by the vehicle, the determining module is further configured to determine a first safe speed $V_1$ based on the information perceived by the vehicle, where $V_1$ is a relative speed between an obstacle and the vehicle, the obtaining module is further configured to obtain information transmitted by an Internet of Vehicles, the determining module is further configured to determine a second safe speed $V_2$ based on the information transmitted by the Internet of Vehicles, where $V_2$ is a relative speed between the obstacle and the vehicle, the obtaining module is further configured to obtain road historical information that is stored in a cloud data center, the determining module is further configured to determine a third safe speed $V_3$ based on the road historical information that is stored in the cloud data center, where $V_3$ is a relative speed between an obstacle and the vehicle, and the second calculation unit is configured to calculate the safe speed of the vehicle according to a formula $V_{safe}=\delta_{1i}*V_1+\delta_{2i}*V_2+\delta_{3i}*V_3$, where $V_{safe}$ is the safe speed, and the safe speed weight includes three parameters, $\delta_{1i}$, $\delta_{2i}$, and $\delta_{3i}$.

In a possible design, the determining module is configured to calculate a target deceleration based on a driving speed of the vehicle, the safe distance, and the safe speed, and determine the target torque based on the target deceleration.

In a possible design, the determining module is further configured to calculate the target deceleration according to the following formula, $$a_{trg} = \frac{v_{safe}^2 - v^2}{2L_{safe}},$$

where $a_{trg}$ is the target deceleration, $V_{safe}$ is the safe speed, $L_{safe}$ is the safe distance, and v is the driving speed of the vehicle.

In a possible design, the information transmitted by the Internet of Vehicles includes at least one of a road-allowed maximum speed, a road slope, a signal light status, a signal light distance, an average traffic speed of a current road, or a first congestion coefficient.

In a possible design, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data.

For beneficial effects of the vehicle braking energy recovering apparatus provided in the second aspect and the possible designs of the second aspect, refer to the beneficial effects brought by the first aspect and the possible designs of the first aspect. Details are not described herein again.

According to a third aspect, an embodiment of this application provides a vehicle, including a processor, configured to obtain current location information of the vehicle, where the processor is further configured to determine a current road scenario based on the current location information of the vehicle, the processor is further configured to determine, based on a mapping relationship between a road scenario and a weight, a weight corresponding to the current road scenario, the processor is further configured to determine a safe distance and a safe speed of the vehicle based on the weight, the processor is further configured to determine the target torque based on the safe distance and the safe speed of the vehicle, and the processor is further configured to control, based on the target torque, a motor of the vehicle to recover braking energy.

In a possible design, the weight includes a safe distance weight and a safe speed weight, the processor is further configured to calculate the safe distance of the vehicle based on the safe distance weight of the vehicle, and the processor is further configured to calculate the safe speed of the vehicle based on the safe speed weight of the vehicle.

In a possible design, the processor is further configured to obtain information perceived by the vehicle, and determine a first safe distance $L_1$ based on the information perceived by the vehicle, where $L_1$ is a relative distance between an obstacle and the vehicle, the processor is further configured to obtain information transmitted by an Internet of Vehicles, and determine a second safe distance $L_2$ based on the information transmitted by the Internet of Vehicles, where $L_2$ is a relative distance between the obstacle and the vehicle, and the processor is further configured to calculate the safe distance of the vehicle according to a formula $L_{safe}=\delta_{1i}*L_1+\delta_{2i}*L_2$, where $L_{safe}$ is the safe distance, and the safe distance weight includes two parameters, $\delta_{1i}$ and $\delta_{2i}$.

In a possible design, the processor is further configured to obtain information perceived by the vehicle, and determine a first safe speed $V_1$ based on the information perceived by the vehicle, where $V_1$ is a relative speed between an obstacle and the vehicle, the processor is further configured to obtain information transmitted by an Internet of Vehicles, and determine a second safe speed $V_2$ based on the information transmitted by the Internet of Vehicles, where $V_2$ is a relative speed between an obstacle and the vehicle, and the processor is further configured to calculate the safe speed of the vehicle according to a formula $V_{safe}=\delta_{1i}*V_1+\delta_{2i}*V_2$, where $V_{safe}$ is the safe speed, and the safe speed includes two parameters, $\delta_{1i}$ and $\delta_{2i}$.

In a possible design, the processor is further configured to obtain information perceived by the vehicle, and determine a first safe distance $L_1$ based on the information perceived by the vehicle, where $L_1$ is a relative distance between an obstacle and the vehicle, the processor is further configured to obtain information transmitted by an Internet of Vehicles, and determine a second safe distance $L_2$ based on the information transmitted by the Internet of Vehicles, where $L_2$ is a relative distance between an obstacle and the vehicle, the processor is further configured to obtain road historical information that is stored in a cloud data center, and determine a third safe distance $L_3$ based on the road historical information that is stored in the cloud data center, where $L_3$ is a relative distance between an obstacle and the vehicle, and the processor is further configured to calculate the safe distance of the vehicle according to a formula $L_{safe}=\delta_{1i}*L_1+\delta_{2i}*L_2+\delta_{3i}*L_3$, where $L_{safe}$ is the safe distance, and the safe distance weight includes three parameters, $\delta_{1i}$, $\delta_{2i}$, and $\delta_{3i}$.

In a possible design, the processor is further configured to obtain information perceived by the vehicle, and determine a first safe speed $V_1$ based on the information perceived by the vehicle, where $V_1$ is a relative speed between an obstacle and the vehicle, the processor is further configured to obtain information transmitted by an Internet of Vehicles, and determine a second safe speed $V_2$ based on the information transmitted by the Internet of Vehicles, where $V_2$ is a relative speed between the obstacle and the vehicle, the processor is further configured to obtain road historical information that is stored in a cloud data center, and determine a third safe speed $V_3$ based on the road historical information that is stored in the cloud data center, where $V_3$ is a relative speed between an obstacle and the vehicle, and the processor is further configured to calculate the safe speed of the vehicle according to a formula $V_{safe}=\delta_{1i}*V_1+\delta_{2i}*V_2+\delta_{3i}*V_3$, where $V_{safe}$ is the safe speed, and the safe speed includes three parameters, $\delta_{1i}$, $\delta_{2i}$, and $\delta_{3i}$.

In a possible design, the processor is further configured to calculate a target deceleration based on a driving speed of the vehicle, the safe distance, and the safe speed, and the processor is further configured to determine the target torque based on the target deceleration.

In a possible design, the processor is further configured to calculate the target deceleration according to the following formula, $$a_{trg} = \frac{v_{safe}^2 - v^2}{2L_{safe}},$$

where $a_{trg}$ is the target deceleration, $V_{safe}$ is the safe speed, $L_{safe}$ is the safe distance, and v is the driving speed of the vehicle.

In a possible design, the information transmitted by the Internet of Vehicles includes at least one of a road-allowed maximum speed, a road slope, a signal light status, a signal light distance, an average traffic speed of a current road, or a first congestion coefficient.

In a possible design, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data.

For beneficial effects of the vehicle provided in the third aspect and the possible designs of the third aspect, refer to the beneficial effects brought by the first aspect and the possible designs of the first aspect. Details are not described herein again.

DESCRIPTION OF EMBODIMENTS

Figure 1:
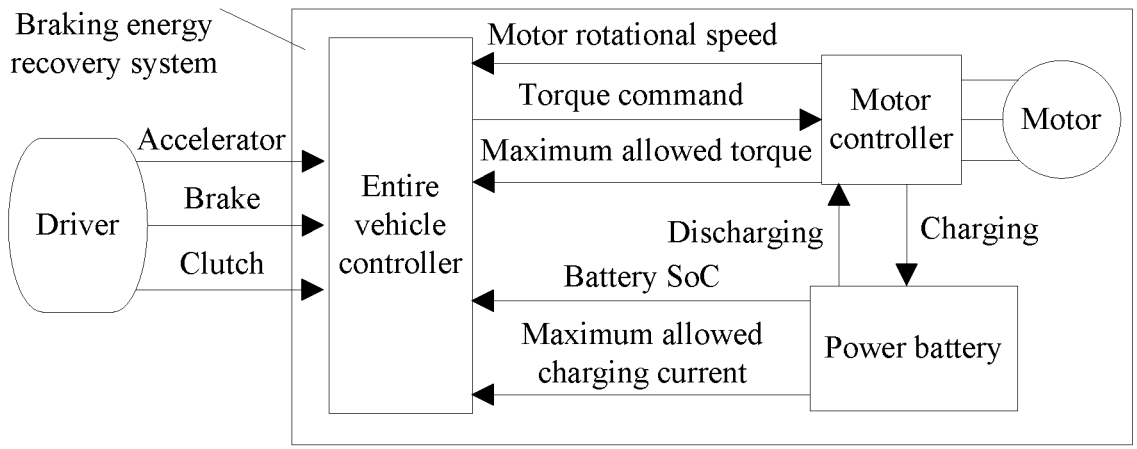
FIG. 1 is a framework diagram of a vehicle braking energy recovery system.
Figure 2:
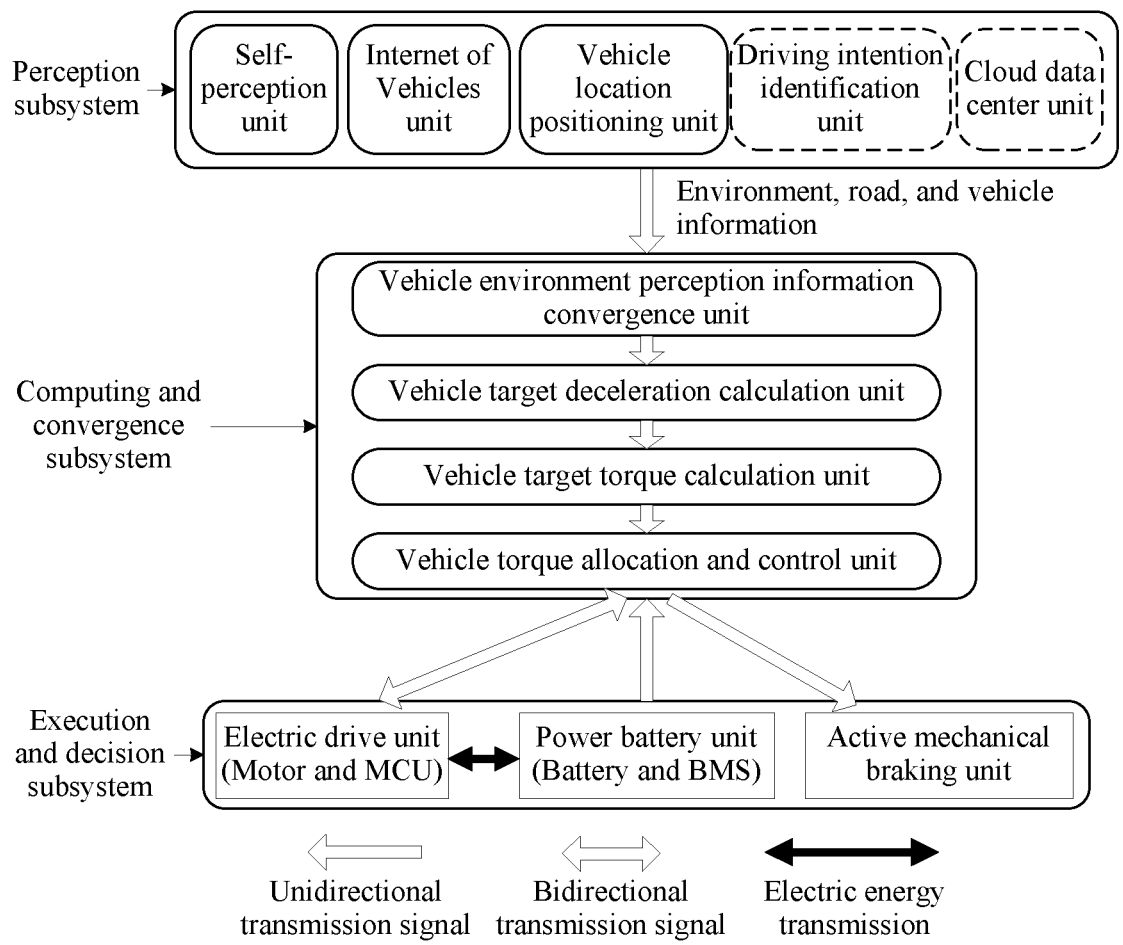
FIG. 2 is a schematic system architectural diagram of a vehicle braking energy recovering method according to various embodiments of the disclosure.

FIG. 2 is a schematic system architectural diagram of a vehicle braking energy recovering method according to this application. As shown in FIG. 2, an embodiment of this application is applicable to an Internet of Vehicles system. The system includes a perception subsystem, a computing and convergence subsystem, and an execution and decision subsystem.

The perception subsystem includes a self-perception unit, an Internet of Vehicles unit, a vehicle location positioning unit, a cloud data center unit, and a driving intention identification unit. The self-perception unit is mainly a laser radar, a millimeter wave radar, a monocular camera, a multi-view camera, an acceleration sensor, or the like that is equipped on an intelligent automobile and that measures a speed/distance/direction of a vehicle. The Internet of Vehicles unit is mainly a module that obtains parameters of a surrounding environment through vehicle-to-vehicle (V2V) information exchange, vehicle-to-infrastructure (V2I) information exchange, and vehicle-to-pedestrian (V2P) information exchange, and provides key environment parameters for vehicle, road, and network coordination. The vehicle location positioning unit mainly provides various types of vehicle positioning information of, for example, the Global Positioning System ( ), the Differential Global Positioning System (DGPS), the BEIDOU navigation system, the GALILEO navigation system, Russia's Globalnaya Navigazionnaya Sputnikovaya Sistema (GLONASS) navigation system, and an inertial measurement unit (IMU) system, and provides meter-level positioning precision, centimeter-level positioning precision, and positioning precision of a lane-line positioning level. The cloud data center unit mainly obtains safe driving data of each road status in different periods under different weather conditions that is obtained based on big data, machine learning, and deep learning, for example, a risk grade and a congestion index. The driving intention identification unit is configured to identify a driver's driving intention based on a status of an accelerator pedal, a status of a brake pedal, and a vehicle control status.

The computing and convergence subsystem mainly includes a vehicle environment perception information convergence unit, a vehicle target deceleration calculation unit, a vehicle target torque calculation unit, and a vehicle torque allocation and control unit. The vehicle environment perception information convergence unit is mainly configured to integrate various parameters obtained by the perception subsystem, and select, based on a type of a vehicle driving scenario, weights of the various parameters as inputs to the vehicle target deceleration calculation module.

The execution and decision subsystem includes an electric drive unit, a power battery unit, and an active mechanical braking unit.

According to the vehicle braking energy recovering method in this embodiment of this application, two types of important information inputs inside the vehicle (an electric drive system, a battery system, a pedal status, a control status, and the like) and outside the vehicle (an environment, a road scenario, an external vehicle, and the like) are comprehensively considered, to perform final regenerative braking control and drive control. Regenerative braking is optimized when a driver performs a corresponding braking operation, and moreover, regenerative braking is intelligently performed based on an environment when the driver has no braking intention. This achieves overall economy of the vehicle and avoids sudden acceleration or sudden deceleration. Mechanical braking is used as least as possible such that optimal control on a driving range is achieved.

The following embodiments describe in detail the technical solutions of this application. The following several embodiments may be combined with each other, and a same or similar concept or process may not be described repeatedly in some embodiments.

Figure 3:
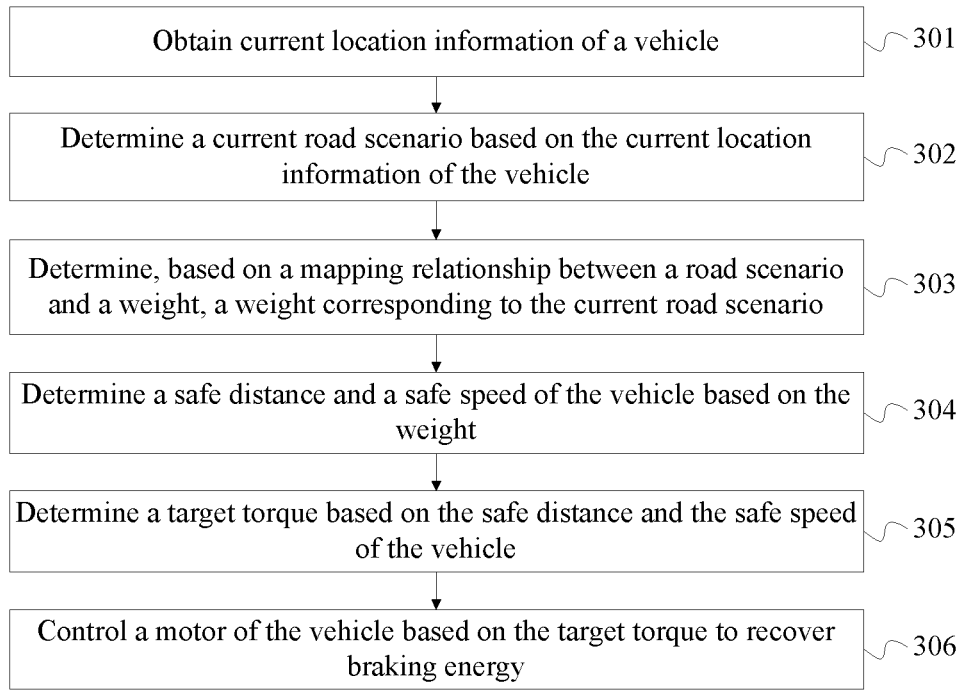
FIG. 3 is a schematic flowchart of Embodiment 1 of a vehicle braking energy recovering method according to various embodiments of the disclosure.

FIG. 3 is a schematic flowchart of Embodiment 1 of a vehicle braking energy recovering method according to this application. This embodiment of this application provides a vehicle braking energy recovering method. The method may be performed by any apparatus that performs a vehicle braking energy recovering method, and the apparatus may be implemented using software and/or hardware. In this embodiment, the apparatus may be integrated into a vehicle.

Based on the system architecture shown in FIG. 2, as shown in FIG. 3, the method in this embodiment may include the following steps.

Step 301: Obtain current location information of a vehicle.

In this embodiment, the vehicle may obtain the current location information of the vehicle using the vehicle location positioning unit of the perception subsystem. In an embodiment, the current location information may be obtained using, for example, the GPS, the DGPS, the Beidou navigation system, the Galileo navigation system, the Russia's GLONASS navigation system, or an IMU system.

Step 302: Determine a current road scenario based on the current location information of the vehicle.

In this embodiment, the vehicle may obtain information such as a road slope $i_1$ and a road speed limit $V_{max1}$ in a first range using the self-perception unit of the perception subsystem, where the first range may be, for example, a maximum distance that can be measured by a radar, a camera, or a sensor, for example, 200 meters (m), may obtain a road-allowed maximum speed $V_{max2}$, a road slope $i_2$, a signal light status $S_{light}$, a distance $L_{light}$ between the vehicle and a signal light, an average traffic speed $V_{avg1}$ of a current road, and a first congestion coefficient $f_1$ using the Internet of Vehicles unit of the perception subsystem, and may obtain an average vehicle speed $V_{avg2}$ on the current road in a current time period, a second congestion coefficient $f_2$, and the like using the cloud data center unit based on a large amount of data obtained using big data, machine learning, and the like.

After obtaining the foregoing information and obtaining the current location information of the vehicle, the vehicle determines the current road scenario based on road type identification information marked on a map. The road type identification information marked on the map includes G (national highways), S (provincial-level roads), X (county-level roads), Y (township-level roads), and the like, or common roads (A-class roads), expressways (B-class roads), intelligent & connected driving dedicated lanes (C-class roads), intelligent & connected driving dedicated roads (D-class roads), and the like. In actual application, based on the foregoing information, the current location information of the vehicle, and the road type identification information marked on the map, the vehicle may determine the current road scenario of the vehicle. The road scenario includes an expressway (a scenario 1), a provincial-level road (a scenario 2), an urban road (a scenario 3), a township-level road (a scenario 4), or the like. For example, if the vehicle obtains a road slope of 30 degress (°), a road-allowed maximum speed of 30 kilometers (km) per hour (h) (km/h), and a first congestion coefficient of 0.1, it indicates that, in an environment of the vehicle, the road slope is relatively large, the road-allowed maximum speed is relatively low, and a vehicle congestion degree is not high. Based on the current location information of the vehicle, the vehicle determines that a location of the vehicle is marked as Y (township-level roads) on the map. In this case, it can be determined that the current road scenario is a township-level road.

It should be noted that the vehicle may determine the current road scenario based only on the current location information, or may determine the current road scenario based on parameters measured by at least one of the self-perception unit, the Internet of Vehicles unit, or the cloud data center unit and based on the current location information. For a manner of determining the current road scenario, no limitation is imposed herein in this embodiment.

Step 303: Determine, based on a mapping relationship between a road scenario and a weight, a weight corresponding to the current road scenario.

In this embodiment, the mapping relationship between a road scenario and a weight is prestored in the vehicle. After determining the current road scenario, the vehicle determines, based on the prestored mapping relationship, the weight corresponding to the current road scenario. In an embodiment, the weight may be allocated based on a manner of determining the current road scenario. For example, if the vehicle determines the current road scenario based on parameters measured by the self-perception unit, the Internet of Vehicles unit, or the cloud data center unit and based on the current location information, weights are determined based on an allocation manner in Table 1.

TABLE 1

| Scenario serial number | δ1 (%) | δ2 (%) | δ3 (%) |
|---|---|---|---|
| Scenario 1 (expressway) | 60 | 20 | 20 |
| Scenario 2 (urban road) | 70 | 30 | 0 |
| Scenario 3 (county-level road) | 80 | 20 | 0 |
| Scenario 4 (township-level road) | 100 | 0 | 0 |

Customized configuration may be performed for δ1, δ2, and δ3. For example, generally in a vehicle sales region, customized configuration may be performed based on traffic rules, map road working conditions, and the like in the sales region. In addition, for a pre-configured market, configuration may be completed before a vehicle leaves a factory, for a post-configured market, configuration may be performed during installation.

It should be noted that δ1, δ2, and δ3 are respectively percentages of weights of data measured by the self-perception unit, the Internet of Vehicles unit, and the cloud data center unit. For example, for a scenario 1 (an expressway), percentages of weights of data measured by the self-perception unit, the Internet of Vehicles unit, and the cloud data center unit are 60%, 20%, and 20%, respectively.

If the vehicle determines the current road scenario based on parameters measured by the self-perception unit and the Internet of Vehicles unit and based on the current location information, weights are determined based on an allocation manner in Table 2.

TABLE 2

| Scenario serial number | δ1 (%) | δ2 (%) |
|---|---|---|
| Scenario 1 (expressway) | 80 | 20 |
| Scenario 2 (urban) | 70 | 30 |
| Scenario 3 (county-level road) | 90 | 10 |
| Scenario 4 (township-level road) | 100 | 0 |

In the scenario 1, the scenario 2, the scenario 3, and the scenario 4, distance parameters obtained by the self-perception system account for largest proportions.

In addition, for a road condition of an expressway, δ2 related to a road condition of 200 meters to several kilometers, which has relatively large impact on a driving speed of the vehicle, and there is no traffic light on the expressway, for an urban road, δ2 is impact of a traffic light status and accounts for a relatively large proportion, and for a township-level road, safe distance data obtained by the self-perception unit is relied on.

Step 304: Determine a safe distance and a safe speed of the vehicle based on the weight.

In this embodiment, optionally, the weight includes a safe distance weight and a safe speed weight. Therefore, in actual application, the determining a safe distance and a safe speed of the vehicle based on the weight includes calculating the safe distance of the vehicle based on the safe distance weight of the vehicle, and calculating the safe speed of the vehicle based on the safe speed weight of the vehicle.

In addition, for a same scenario, the safe distance weight of the vehicle and the safe speed weight of the vehicle may be the same, or may be different.

Optionally, implementable manners of calculating the safe distance of the vehicle based on the safe distance weight of the vehicle may include the following types.

Figure 4:
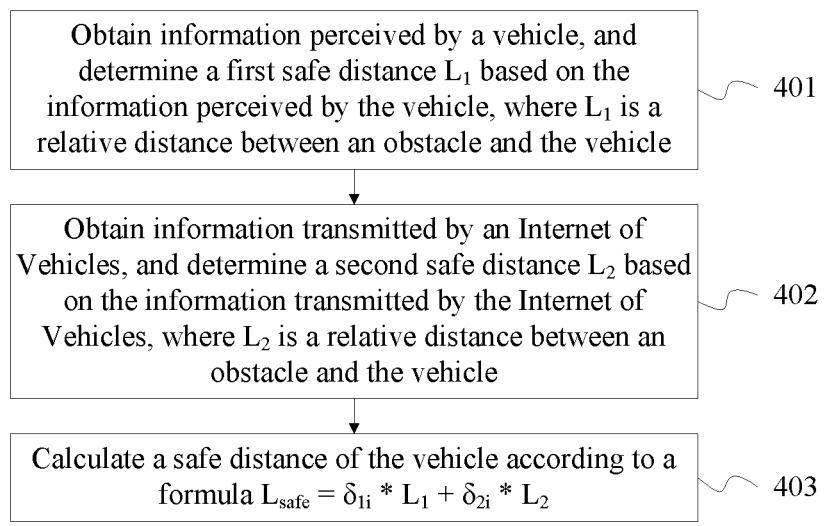
FIG. 4 is a schematic flowchart 1 of calculating a safe distance of a vehicle.

Manner 1: Referring to a schematic flowchart 1 of calculating a safe distance of a vehicle shown in FIG. 4, step 304 may include the following steps.

Step 401: Obtain information perceived by the vehicle, and determine a first safe distance $L_1$ based on the information perceived by the vehicle, where $L_1$ is a relative distance between an obstacle and the vehicle.

In an embodiment, the vehicle may obtain, using a radar, a camera, another type of sensor, or the like in the self-perception unit, the information perceived by the vehicle, and further determine the relative distance $L_1$ between an obstacle and the vehicle, namely, the first safe distance $L_1$. The obstacle includes a moving or static object, for example, includes an object such as another vehicle or a railing.

Step 402: Obtain information transmitted by an Internet of Vehicles, and determine a second safe distance $L_2$ based on the information transmitted by the Internet of Vehicles, where $L_2$ is a relative distance between an obstacle and the vehicle.

In an embodiment, the vehicle may obtain, through V2V, V2I, V2P, or the like of the Internet of Vehicles unit, the information transmitted by the Internet of Vehicles, and further determines the relative distance $L_2$ between an obstacle and the vehicle, namely, the second safe distance $L_2$. The obstacle may also include a moving or static object, for example, include an object such as another vehicle or a railing.

Optionally, the information transmitted by the Internet of Vehicles includes at least one of a road-allowed maximum speed, a road slope, a signal light status, a signal light distance, an average traffic speed of a current road, and a first congestion coefficient. The first congestion coefficient may be represented by any value from 0 to 1. A larger value indicates severer vehicle congestion.

Step 403: Calculate the safe distance of the vehicle according to a formula $L_{safe} = \delta_{1i} * L_1 + \delta_{2i} * L_2$.

$L_{safe}$ is the safe distance, and the safe distance weight includes two parameters, $\delta_{1i}$ and $\delta_{2i}$. In an embodiment, because information obtained by the vehicle includes the information perceived by the vehicle and the information transmitted by the Internet of Vehicles, the safe distance weight in the current road scenario may be determined based on the mapping relationship in Table 2 in step 303. For example, the vehicle runs in the scenario 1 (an expressway). In this scenario, parameters of the safe distance weight are $\delta_{1i} = 80\%$ and $\delta_{2i} = 20\%$, and are represented by (0.8 0.2). In addition, after the first safe distance $L_1$ and the second safe distance $L_2$ are obtained, the safe distance of the vehicle is calculated according to the formula $L_{safe} = \delta_{1i} * L_1 + \delta_{2i} * L_2$.

Figure 5:
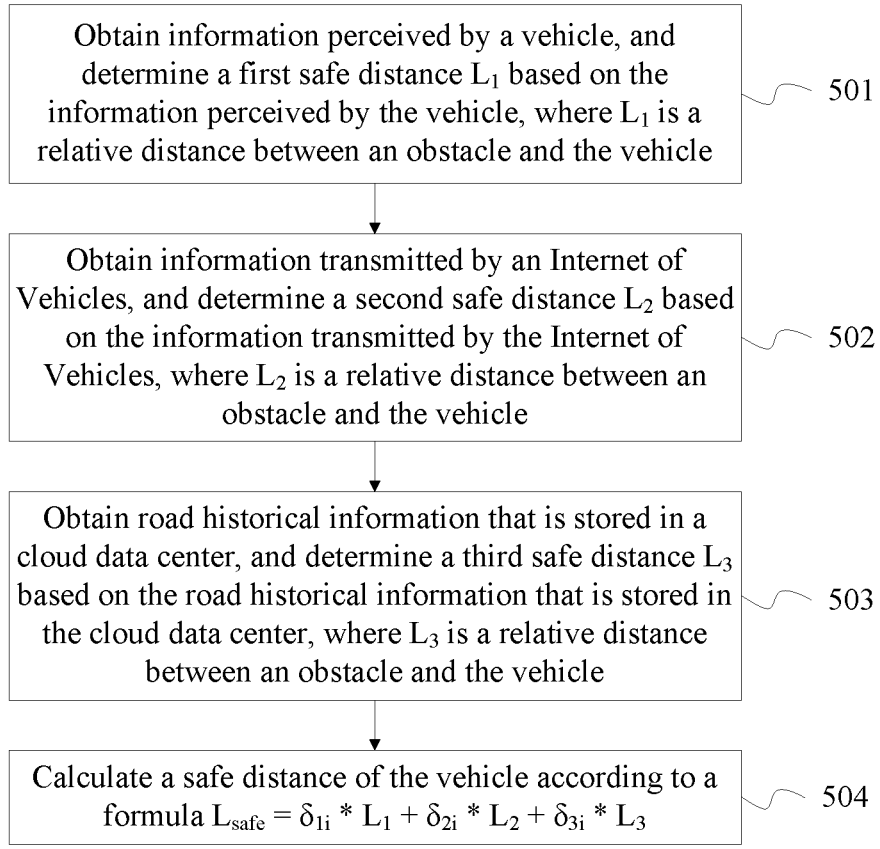
FIG. 5 is a schematic flowchart 2 of calculating a safe distance of a vehicle.

Manner 2: Referring to a schematic flowchart 2 of calculating a safe distance of a vehicle shown in FIG. 5, step 304 may include the following steps.

Step 501: Obtain information perceived by the vehicle, and determine a first safe distance $L_1$ based on the information perceived by the vehicle, where $L_1$ is a relative distance between an obstacle and the vehicle.

Step 502: Obtain information transmitted by an Internet of Vehicles, and determine a second safe distance $L_2$ based on the information transmitted by the Internet of Vehicles, where $L_2$ is a relative distance between an obstacle and the vehicle.

Step 501 and step 502 are similar to step 401 and step 402, and details are not described herein again.

Step 503: Obtain road historical information that is stored in a cloud data center, and determine a third safe distance $L_3$ based on the road historical information that is stored in the cloud data center, where $L_3$ is a relative distance between an obstacle and the vehicle.

In an embodiment, the vehicle may obtain safe driving data in different time periods under different weather conditions using the cloud data center unit based on big data, machine learning, deep learning, or the like, that is, obtain the relative distance $L_3$ between an obstacle and the vehicle, namely, the third safe distance $L_3$.

Optionally, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data. The second congestion coefficient may be represented by any value from 0 to 1. A larger value indicates severer vehicle congestion.

Step 504: Calculate the safe distance of the vehicle according to a formula $L_{safe} = \delta_{1i}*L_1 + \delta_{2i}*L_2 + \delta_{3i}*L_3$.

L safe is the safe distance, and the safe distance weight includes three parameters, $\Gamma_{2i}$, and $\delta_{3i}$. In an embodiment, because information obtained by the vehicle includes the information perceived by the vehicle, the information transmitted by the Internet of Vehicles, and the road historical information that is stored in the cloud data center, the safe distance weight in the current road scenario may be determined based on the mapping relationship in Table 1 in step 303. For example, the vehicle runs in the scenario 2 (an expressway). In this scenario, parameters of the safe distance weight are $\delta_{1i}=70\%$, $\delta_{2i}=30\%$, and $\delta_{3i}=0$, and are represented by (0.7 0.3 0). In addition, after the first safe distance $L_1$, the second safe distance $L_2$, and the third safe distance $L_3$ are obtained, the safe distance of the vehicle is calculated according to the formula $L_{safe} = \delta_{1i}*L_1 + \delta_{2i}*L_2 + \delta_{3i}*L_3$.

Optionally, implementable manners of calculating the safe speed of the vehicle based on the safe speed weight of the vehicle may include the following types.

Figure 6:
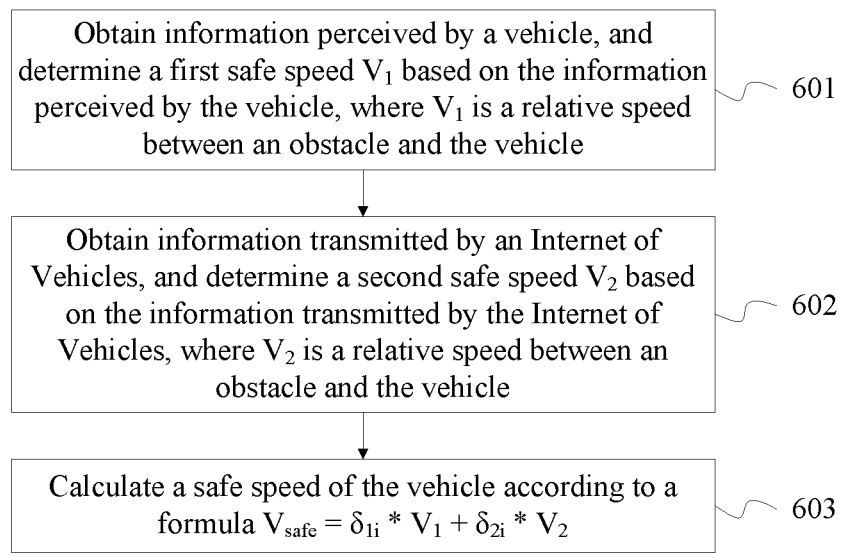
FIG. 6 is a schematic flowchart 1 of calculating a safe speed of a vehicle.

Manner 1: Referring to a schematic flowchart 1 of calculating a safe speed of a vehicle shown in FIG. 6, step 304 may include the following steps.

Step 601: Obtain information perceived by the vehicle, and determine a first safe speed $V_1$ based on the information perceived by the vehicle, where $V_1$ is a relative speed between an obstacle and the vehicle.

In an embodiment, the vehicle may obtain, using a radar, a camera, another type of sensor, or the like in the self-perception unit, the information perceived by the vehicle, and further determine the relative speed $V_1$ between an obstacle and the vehicle, namely, the first safe speed $V_1$. The obstacle includes a moving or static object, for example, includes an object such as another vehicle or a railing.

Step 602: Obtain information transmitted by an Internet of Vehicles, and determine a second safe speed $V_2$ based on the information transmitted by the Internet of Vehicles, where $V_2$ is a relative speed between an obstacle and the vehicle.

In an embodiment, the vehicle may obtain, through V2V, V2I, V2P, or the like of the Internet of Vehicles unit, the information transmitted by the Internet of Vehicles, and further determine the relative speed $V_2$ between an obstacle and the vehicle, namely, the second safe speed $V_2$. The obstacle may also include a moving or static object, for example, include an object such as another vehicle or a railing.

Optionally, the information transmitted by the Internet of Vehicles includes at least one of a road-allowed maximum speed, a road slope, a signal light status, a signal light distance, an average traffic speed of a current road, and a first congestion coefficient. The first congestion coefficient may be represented by any value from 0 to 1. A larger value indicates severer vehicle congestion.

Step 603: Calculate the safe speed of the vehicle according to a formula $V_{safe} = \delta_{1i}*V_1 + \delta_{2i}*V_2$.

$V_{safe}$ the safe speed, and the safe speed includes two parameters, $\delta_{1i}$ and $\delta_{2i}$. In an embodiment, because information obtained by the vehicle includes the information perceived by the vehicle and the information transmitted by the Internet of Vehicles, the safe speed weight in the current road scenario may be determined based on the mapping relationship in Table 2 in step 303. For example, the vehicle runs in the scenario 1 (an expressway). In this scenario, parameters of the safe speed weight are $\delta_{1i}=80\%$ and $\delta_{2i}=20\%$, and are represented by (0.8 0.2). In addition, after the first safe speed $V_1$ and the second safe speed $V_2$ are obtained, the safe speed of the vehicle is calculated according to the formula $V_{safe} = \delta_{1i}*V_1 + \delta_{2i}*V_2$.

Figure 7:
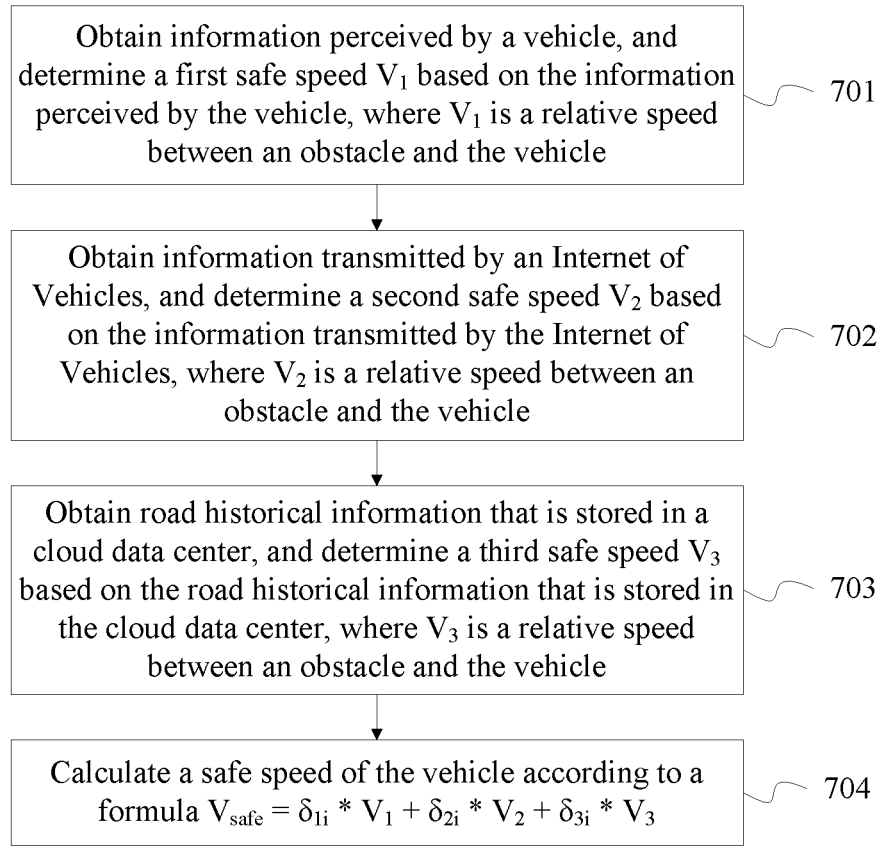
FIG. 7 is a schematic flowchart 2 of calculating a safe speed of a vehicle.

Manner 2: Referring to a schematic flowchart 2 of calculating a safe speed of a vehicle shown in FIG. 7, step 304 may include the following steps.

Step 701: Obtain information perceived by the vehicle, and determine a first safe speed $V_1$ based on the information perceived by the vehicle, where $V_1$ is a relative speed between an obstacle and the vehicle.

Step 702: Obtain information transmitted by an Internet of Vehicles, and determine a second safe speed $V_2$ based on the information transmitted by the Internet of Vehicles, where $V_2$ is a relative speed between an obstacle and the vehicle.

Step 701 and step 702 are similar to step 601 and step 602, and details are not described herein again.

Step 703: Obtain road historical information that is stored in a cloud data center, and determine a third safe speed $V_3$ based on the road historical information that is stored in the cloud data center, where $V_3$ is a relative speed between an obstacle and the vehicle.

In an embodiment, the vehicle may obtain safe driving data in different time periods under different weather conditions using the cloud data center unit based on big data, machine learning, deep learning, or the like, that is, obtain the relative speed $V_3$ between an obstacle and the vehicle, namely, the third safe speed $V_3$.

Optionally, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data. The second congestion coefficient may be represented by any value from 0 to 1. A larger value indicates severer vehicle congestion.

Step 704: Calculate the safe speed of the vehicle according to a formula $V_{safe} = \delta_{1i}*V_1 + \delta_{2i}*V_2 + \delta_{3i}*V_3$.

$V_{safe}$ is the safe speed, and the safe speed includes three parameters, $\delta_{1i}$, $\delta_{2i}$, and $\delta_{3i}$. In an embodiment, because information obtained by the vehicle includes the information perceived by the vehicle, the information transmitted by the Internet of Vehicles, and the road historical information that is stored in the cloud data center, the safe speed weight in the current road scenario may be determined based on the mapping relationship in Table 1 in step 303. For example, the vehicle runs in the scenario 2 (an expressway). In this scenario, parameters of the safe speed weight are $\delta_{1i}=70\%$, $\delta_{2i}=30\%$, and $\delta_{3i}=0$, and are represented by (0.7, 0.3, and 0, respectively). In addition, after the first safe speed $V_1$, the second safe speed $V_2$, and the third safe speed $V_3$ are obtained, the safe distance of the vehicle is calculated according to the formula $V_{safe}=\delta_{1i}*V_1+\delta_{2i}*V_2+\delta_{3i}*V_3$.

Step 305: Determine a target torque based on the safe distance and the safe speed of the vehicle.

In this embodiment, after the safe distance and the safe speed of the vehicle are calculated, the target torque is determined based on the calculated safe distance and safe speed such that the vehicle determines, based on the target torque and a driving intention of a driver, a torque required by the entire vehicle to control a motor of the vehicle to recover braking energy.

Optionally, the determining a target torque based on the safe distance and the safe speed of the vehicle includes calculating a target deceleration based on a driving speed of the vehicle, the safe distance, and the safe speed, and determining the target torque based on the target deceleration.

In an embodiment, the vehicle target deceleration calculation unit in the computing and convergence subsystem may calculate the target deceleration according to a formula $$a_{trg} = \frac{v_{safe}^2 - v^2}{2L_{safe}},$$

where $a_{trg}$ is the target deceleration, $V_{safe}$ is the safe speed, $L_{safe}$ is the safe distance, and v is the driving speed of the vehicle.

After the target deceleration is determined, the vehicle target torque calculation unit calculates the target torque based on the target deceleration, a road slope i obtained by the perception subsystem, and a vehicle dynamics model. In an embodiment, the target torque may be calculated according to a formula $$\frac{\left(Gf + \frac{C_D A}{21.15}v^2 + Gi + \delta m a_{trg}\right)r}{i_g i_0 \eta_T} = T_{trg}.$$

G is a weight of the vehicle, f is a rolling resistance coefficient, $C_D$ is a wind resistance coefficient, A is a frontal area of the vehicle, v is a real-time driving speed of the vehicle, i is a slope of a road on which the vehicle runs, δ is a rotational mass conversion coefficient, m is a mass of the vehicle, $a_{trg}$ is the target deceleration, r is a radius of a wheel of the vehicle, $i_g$ is a transmission gear ratio of the vehicle, $i_0$ is a final drive ratio, $\eta_T$ is a mechanical transmission efficiency, and $T_{trg}$ is the target torque.

When $T_{trg}$ is greater than 0, $T_{trg}$ is a target driving torque, or when $T_{trg}$ is less than 0, $T_{trg}$ is a target braking torque.

In this embodiment, the target torque is calculated by introducing the vehicle dynamics model to achieve an objective of recovering braking energy based on overall economic considerations.

Step 306: Control, based on the target torque, a motor of the vehicle to recover braking energy.

In this embodiment, after determining the target torque, the vehicle determines, based on the target torque and a driving intention that is identified by a driving intention identification unit, the torque required by the entire vehicle, and allocates the determined torque required by the entire vehicle, to control the motor of the vehicle to recover the braking energy.

In an embodiment, the vehicle torque allocation and control unit allocates the torque based on a maximum output torque value of the motor in the vehicle, a minimum output torque value of the motor in the vehicle, real-time allowable charging power of a battery in the vehicle, and real-time allowable discharging power of a battery in the vehicle to control the motor and an active mechanical braking system to work.

According to the vehicle braking energy recovering method provided in this embodiment of the this application, the current location information of the vehicle is obtained, the current road scenario is determined based on the current location information of the vehicle, the weight corresponding to the current road scenario is determined based on the mapping relationship between a road scenario and a weight, the safe distance and the safe speed of the vehicle are determined based on the weight, then the target torque is determined based on the safe distance and the safe speed of the vehicle, and finally, the motor of the vehicle is controlled based on the target torque to recover the braking energy. The safe speed and the safe distance of the vehicle are determined based on the current road scenario of the vehicle, and then the target torque is determined for recovering the braking energy. In an embodiment, the road scenario is determined based on information perceived by the vehicle, and different weights are assigned to different road scenarios to calculate the safe distance and the safe speed, then determine the target deceleration, and allocate the torque, thereby improving a braking energy recovery rate.

Figure 8:
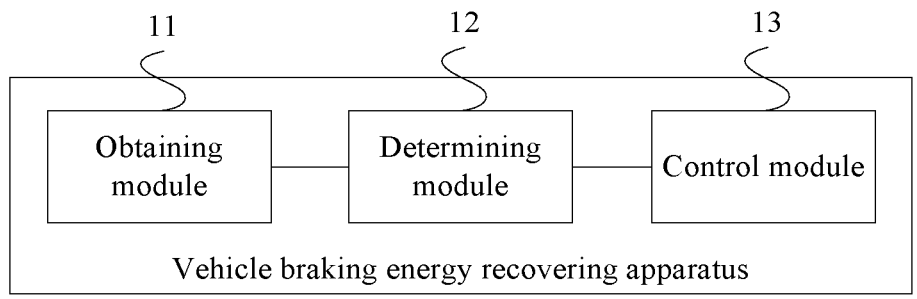
FIG. 8 is a schematic structural diagram of Embodiment 1 of a vehicle braking energy recovering apparatus according to various embodiments of the disclosure.

FIG. 8 is a schematic structural diagram of Embodiment 1 of a vehicle braking energy recovering apparatus according to an embodiment of this application. The recovering apparatus may be an independent vehicle, or may be an apparatus integrated into a vehicle. The apparatus may be implemented using software, hardware, or a combination of software and hardware. As shown in FIG. 8, the recovering apparatus includes an obtaining module 11, configured to obtain current location information of a vehicle, a determining module 12, configured to determine a current road scenario based on the current location information of the vehicle, where the determining module 12 is further configured to determine, based on a mapping relationship between a road scenario and a weight, a weight corresponding to the current road scenario, the determining module 12 is further configured to determine a safe distance and a safe speed of the vehicle based on the weight, and the determining module 12 is further configured to determine the target torque based on the safe distance and the safe speed of the vehicle, and a control module 13, configured to control, based on the target torque, a motor of the vehicle to recover braking energy.

Optionally, the obtaining module 11, the determining module 12, and the control module 13 may correspond to a processor in the vehicle.

The vehicle braking energy recovering apparatus provided in this embodiment of this application may perform the foregoing method embodiments. Implementation principles and technical effects of the apparatus are similar to those of the method embodiments, and details are not described herein again.

Figure 9:
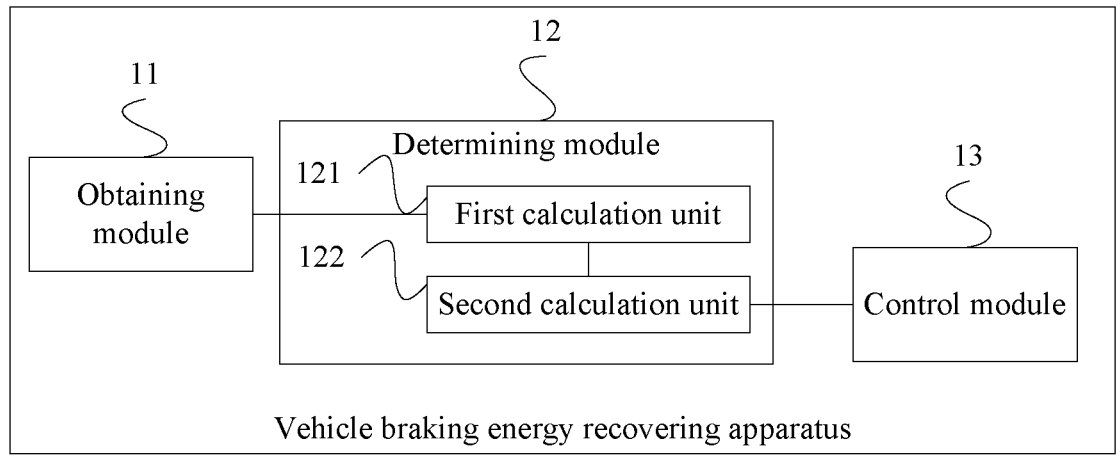
FIG. 9 is a schematic structural diagram of Embodiment 2 of a vehicle braking energy recovering apparatus according to various embodiments of the disclosure.

FIG. 9 is a schematic structural diagram of Embodiment 2 of a vehicle braking energy recovering apparatus according to an embodiment of this application. Based on the foregoing embodiment, further, the weight includes a safe distance weight and a safe speed weight, and the determining module 12 includes a first calculation unit 121, configured to calculate the safe distance of the vehicle based on the safe distance weight of the vehicle, and a second calculation unit 122, configured to calculate the safe speed of the vehicle based on the safe speed weight of the vehicle.

Optionally, the obtaining module 11 is further configured to obtain information perceived by the vehicle, the determining module 12 is further configured to determine a first safe distance $L_1$ based on the information perceived by the vehicle, where $L_1$ is a relative distance between an obstacle and the vehicle, the obtaining module 11 is further configured to obtain information transmitted by an Internet of Vehicles, the determining module 12 is further configured to determine a second safe distance $L_2$ based on the information transmitted by the Internet of Vehicles, where $L_2$ is a relative distance between the obstacle and the vehicle, and the first calculation unit 121 is configured to calculate the safe distance of the vehicle according to a formula $L_{safe}=\delta_{1i}*L_1+\delta_{2i}*L_2$, where $L_{safe}$ is the safe distance, and the safe distance weight includes two parameters, $\delta_{1i}$ and $\delta_{2i}$.

Optionally, the obtaining module 11 is further configured to obtain information perceived by the vehicle, the determining module 12 is further configured to determine a first safe speed $V_1$ based on the information perceived by the vehicle, where $V_1$ is a relative speed between an obstacle and the vehicle, the obtaining module 11 is further configured to obtain information transmitted by an Internet of Vehicles, the determining module 12 is further configured to determine a second safe speed $V_2$ based on the information transmitted by the Internet of Vehicles, where $V_2$ is a relative speed between an obstacle and the vehicle, and the second calculation unit 122 is configured to calculate the safe speed of the vehicle according to a formula $V_{safe}=\delta_{1i}*V_1+*\delta_{2i}*V_2$, where $V_{safe}$ is the safe speed, and the safe speed includes two parameters, $\delta_{1i}$ and $\delta_{2i}$.

Optionally, the obtaining module 11 is further configured to obtain information perceived by the vehicle, the determining module 12 is further configured to determine a first safe distance $L_1$ based on the information perceived by the vehicle, where $L_1$ is a relative distance between an obstacle and the vehicle, the obtaining module 11 is further configured to obtain information transmitted by an Internet of Vehicles, the determining module 12 is further configured to determine a second safe distance $L_2$ based on the information transmitted by the Internet of Vehicles, where $L_2$ is a relative distance between an obstacle and the vehicle, the obtaining module 11 is further configured to obtain road historical information that is stored in a cloud data center, the determining module 12 is further configured to determine a third safe distance $L_3$ based on the road historical information that is stored in the cloud data center, where $L_3$ is a relative distance between an obstacle and the vehicle, and the first calculation unit 121 is configured to calculate the safe distance of the vehicle according to a formula $L_{safe}=\delta_{1i}*L_1+\delta_{2i}*L_2+\delta_{3i}*L_3$, where $L_{safe}$ is the safe distance, and the safe distance weight includes three parameters, $\delta_{1i}$, $\delta_{2i}$, and $\delta_{3i}$.

Optionally, the obtaining module 11 is further configured to obtain information perceived by the vehicle, the determining module 12 is further configured to determine a first safe speed $V_1$ based on the information perceived by the vehicle, where $V_1$ is a relative speed between an obstacle and the vehicle, the obtaining module 11 is further configured to obtain information transmitted by an Internet of Vehicles, the determining module 12 is further configured to determine a second safe speed $V_2$ based on the information transmitted by the Internet of Vehicles, where $V_2$ is a relative speed between the obstacle and the vehicle, the obtaining module 11 is further configured to obtain road historical information that is stored in a cloud data center, the determining module 12 is further configured to determine a third safe speed $V_3$ based on the road historical information that is stored in the cloud data center, where $V_3$ is a relative speed between an obstacle and the vehicle, and the second calculation unit 122 is configured to calculate the safe speed of the vehicle according to a formula $V_{safe}=\delta_{1i}*V_1+\delta_{2i}*V_2+\delta_{3i}*V_3$, where $V_{safe}$ is the safe speed, and the safe speed includes three parameters, $\delta_{1i}$, $\delta_{2i}$, and $\delta_{3i}$.

Optionally, the determining module 12 is configured to calculate a target deceleration based on a driving speed of the vehicle, the safe distance, and the safe speed, and determine the target torque based on the target deceleration.

Optionally, the determining module 12 is further configured to calculate the target deceleration according to the following formula, $$a_{trg}=\frac{v_{safe}^2-v^2}{2L_{safe}},$$

where $a_{trg}$ is the target deceleration, V safe is the safe speed, $L_{safe}$ is the safe distance, and v is the driving speed of the vehicle.

Optionally, the information transmitted by the Internet of Vehicles includes at least one of a road-allowed maximum speed, a road slope, a signal light status, a signal light distance, an average traffic speed of a current road, or a first congestion coefficient.

Optionally, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data.

The vehicle braking energy recovering apparatus provided in this embodiment of this application may perform the foregoing method embodiments. Implementation principles and technical effects of the apparatus are similar to those of the method embodiments, and details are not described herein again.

Figure 10:
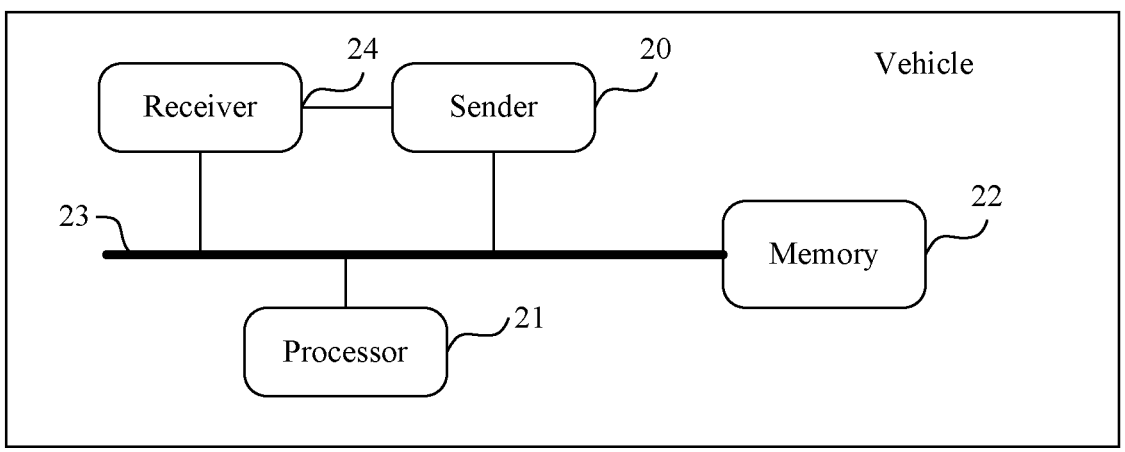
FIG. 10 is a schematic structural diagram of an embodiment of a vehicle according to various embodiments of the disclosure.

FIG. 10 is a schematic structural diagram of an embodiment of a vehicle according to this application. As shown in FIG. 10, the vehicle may include a sender 20, a processor 21, a memory 22, and at least one communications bus 23. The communications bus 23 is configured to implement communication connection between elements. The memory 22 may include a high-speed random access memory (RAM) memory, or may further include a nonvolatile memory (NVM), for example, at least one magnetic disk storage. In the memory 22, various programs may be stored and used to complete various processing functions and implement the steps of the method in the embodiments. In addition, the vehicle may further include a receiver 24. The receiver 24 in this embodiment may be a corresponding input interface that has a communications function and an information receiving function. The sender 20 in this embodiment may be a corresponding output interface that has a communications function and an information sending function. Optionally, the sender 20 and the receiver 24 may be integrated into one communications interface, or may be two independent communications interfaces.

In this embodiment, the processor 21 is configured to obtain current location information of the vehicle, the processor 21 is further configured to determine a current road scenario based on the current location information of the vehicle, the processor 21 is further configured to determine, based on a mapping relationship between a road scenario and a weight, a weight corresponding to the current road scenario, the processor 21 is further configured to determine a safe distance and a safe speed of the vehicle based on the weight, the processor 21 is further configured to determine the target torque based on the safe distance and the safe speed of the vehicle, and the processor 21 is further configured to control, based on the target torque, a motor of the vehicle to recover braking energy.

Optionally, the weight includes a safe distance weight and a safe speed weight, the processor 21 is further configured to calculate the safe distance of the vehicle based on the safe distance weight of the vehicle, and the processor 21 is further configured to calculate the safe speed of the vehicle based on the safe speed weight of the vehicle.

Optionally, the processor 21 is further configured to obtain information perceived by the vehicle, and determine a first safe distance $L_1$ based on the information perceived by the vehicle, where $L_1$ is a relative distance between an obstacle and the vehicle, the processor 21 is further configured to obtain information transmitted by an Internet of Vehicles, and determine a second safe distance $L_2$ based on the information transmitted by the Internet of Vehicles, where $L_2$ is a relative distance between the obstacle and the vehicle, and the processor 21 is further configured to calculate the safe distance of the vehicle according to a formula $L_{safe}=\delta_{1i}*L_1+\delta_{2i}*L_2$, where $L_{safe}$ is the safe distance, and the safe distance weight includes two parameters, $\delta_{1i}$ and $\delta_{2i}$.

Optionally, the processor 21 is further configured to obtain information perceived by the vehicle, and determine a first safe speed $V_1$ based on the information perceived by the vehicle, where $V_1$ is a relative speed between an obstacle and the vehicle, the processor 21 is further configured to obtain information transmitted by an Internet of Vehicles, and determine a second safe speed $V_2$ based on the information transmitted by the Internet of Vehicles, where $V_2$ is a relative speed between an obstacle and the vehicle, and the processor 21 is further configured to calculate the safe speed of the vehicle according to a formula $V_{safe}=\delta_{1i}*V_1+\delta_{2i}*V_2$, where $V_{safe}$ is the safe speed, and the safe speed includes two parameters, $\delta_{1i}$ and $\delta_{2i}$.

Optionally, the processor 21 is further configured to obtain information perceived by the vehicle, and determine a first safe distance $L_1$ based on the information perceived by the vehicle, where $L_1$ is a relative distance between an obstacle and the vehicle, the processor 21 is further configured to obtain information transmitted by an Internet of Vehicles, and determine a second safe distance $L_2$ based on the information transmitted by the Internet of Vehicles, where $L_2$ is a relative distance between an obstacle and the vehicle, the processor 21 is further configured to obtain road historical information that is stored in a cloud data center, and determine a third safe distance $L_3$ based on the road historical information that is stored in the cloud data center, where $L_3$ is a relative distance between an obstacle and the vehicle, and the processor 21 is further configured to calculate the safe distance of the vehicle according to a formula $L_{safe}=\delta_{1i}*L_1+\delta_{2i}*L_2+\delta_{3i}*L_3$, where $L_{safe}$ is the safe distance, and the safe distance weight includes three parameters, $\delta_{1i}$, $\delta_{2i}$, and $\delta_{3i}$.

Optionally, the processor 21 is further configured to obtain information perceived by the vehicle, and determine a first safe speed $V_1$ based on the information perceived by the vehicle, where $V_1$ is a relative speed between an obstacle and the vehicle, the processor 21 is further configured to obtain information transmitted by an Internet of Vehicles, and determine a second safe speed $V_2$ based on the information transmitted by the Internet of Vehicles, where $V_2$ is a relative speed between the obstacle and the vehicle, the processor 21 is further configured to obtain road historical information that is stored in a cloud data center, and determine a third safe speed $V_3$ based on the road historical information that is stored in the cloud data center, where $V_3$ is a relative distance between an obstacle and the vehicle, and the processor 21 is further configured to calculate the safe speed of the vehicle according to a formula $V_{safe}=\delta_{1i}*V_1+\delta_{2i}*V_2+\delta_{3i}*V_3$, where $V_{safe}$ is the safe speed, and the safe speed includes three parameters, $\delta_{1i}$, $\delta_{2i}$, and $\delta_{3i}$.

Optionally, the processor 21 is further configured to calculate a target deceleration based on a driving speed of the vehicle, the safe distance, and the safe speed, and the processor 21 is further configured to determine the target torque based on the target deceleration.

Optionally, the processor 21 is further configured to calculate the target deceleration according to the following formula, $$a_{trg} = \frac{v_{safe}^2 - v^2}{2L_{safe}},$$

where $a_{trg}$ is the target deceleration, $V_{safe}$ is the safe speed, $L_{safe}$ is the safe distance, and V is the driving speed of the vehicle.

Optionally, the information transmitted by the Internet of Vehicles includes at least one of a road-allowed maximum speed, a road slope, a signal light status, a signal light distance, an average traffic speed of a current road, or a first congestion coefficient.

Optionally, the road historical information that is stored in the cloud data center includes an average vehicle speed in a current time period, an average vehicle distance in the current time period, and a second congestion coefficient, where the average vehicle speed in the current time period, the average vehicle distance in the current time period, and the second congestion coefficient are obtained through calculation by the cloud data center based on a machine learning algorithm and historical data.

The vehicle provided in this embodiment of this application may perform the foregoing method embodiments. Implementation principles and technical effects of the vehicle are similar to those of the method embodiments, and details are not described herein again.

It may be clearly understood by a person skilled in the art that, for the purpose of convenient and brief description, division of the foregoing function modules is merely used as an example for illustration. In actual application, the foregoing functions can be allocated to different function modules and computing hardware to be implemented based on a requirement, that is, an inner structure of the apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in any combination of hardware, software, or firmware.

In an embodiment, the integrated unit may be stored in a non-transitory computer-readable storage medium. In this embodiment, several instructions for instructing a computer device (which may be a personal computer, a server, a network device, or the like) or a processor to perform all or a part of the steps of the methods described in the embodiments of this application are stored in a memory. The foregoing storage medium includes any medium that can store program code, such as a USB flash drive, a removable hard disk, a read-only memory (ROM), a RANI, a magnetic disk, or an optical disc.

What is claimed is:

1. A vehicle braking control method, comprising:
    obtaining inside information of a first vehicle;
    obtaining outside information of the first vehicle, wherein the outside information comprises first information from sensors on the first vehicle and second information from an internet of vehicles (IoV), and wherein the second information comprises a status of a traffic light and a distance between the traffic light and the first vehicle; and
    performing regenerative braking control based on the inside information and the outside information by controlling a motor to recover braking energy based on a speed of the vehicle, the status, and the distance.

2. The vehicle braking control method of claim 1, further comprising:
    determining a driving intention based on the inside information, wherein the inside information comprises a status of an accelerator pedal of the first vehicle, a status of a brake pedal of the first vehicle, and a vehicle control status of the first vehicle;
    determining a parameter based on the first information and the second information, wherein the parameter comprises at least one of a safe distance or a safe speed;
    determining a target torque based on the parameter; and
    further performing the regenerative braking control by controlling, based on the target torque and the driving intention, a motor of the first vehicle to recover braking energy.

3. The vehicle braking control method of claim 2, further comprising:
    determining a first distance based on the first information, wherein the first distance is a first relative distance between a first obstacle and the first vehicle, and wherein the first obstacle comprises a first moving object or a first static object;
    determining a second distance based on the second information, wherein the second distance is a second relative distance between a second obstacle and the first vehicle, and wherein the second obstacle comprises a second moving object or a second static object; and
    determining the safe distance based on the first distance and the second distance.

4. The vehicle braking control method of claim 3, further comprising:
    obtaining current location information of the vehicle;
    determining a current road scenario based on the current location information; and
    determining a distance weight corresponding to the current road scenario based on a mapping relationship between the current road scenario and the distance weight, and
    wherein determining the safe distance comprises determining the safe distance based on the first distance, the second distance, and the distance weight.

5. The vehicle braking control method of claim 2, further comprising:
    determining a first speed based on the first information, wherein the first speed is a first relative speed between a first obstacle and the first vehicle, and wherein the first obstacle comprises a first moving object or a first static object;
    determining a second speed based on the second information, wherein the second speed is a second relative speed between a second obstacle and the first vehicle, and wherein the second obstacle comprises a second moving object or a second static object; and
    determining the safe speed based on the first speed and the second speed.

6. The vehicle braking control method of claim 5, further comprising:
    obtaining current location information of the vehicle;
    determining a current road scenario based on the current location information of the vehicle; and
    determining a speed weight corresponding to the current road scenario based on a mapping relationship between the current road scenario and the speed weight, and
    wherein determining the safe speed comprises determining the safe speed based on the first speed, the second speed, and the speed weight.

7. The vehicle braking control method of claim 1, wherein the outside information comprises information of at least one of an environment, a road scenario, or an external vehicle.

8. The vehicle braking control method of claim 1, wherein the second information comprises at least one of a road-allowed maximum speed, a road slope, a signal light status, a signal light distance, an average traffic speed of a current road, or a first congestion coefficient.

9. A vehicle braking control apparatus, comprising:
    a memory configured to store instructions; and
    a processor coupled to the memory and configured to execute the instructions, which when executed by the processor, cause the vehicle braking control apparatus to be configured to:

obtain inside information of a first vehicle;
obtain outside information of the first vehicle, wherein the outside information comprises first information from sensors on the first vehicle and second information from an internet of vehicles (IoV), wherein the second information comprises a status of a traffic light and a distance between the traffic light and the first vehicle; and
perform regenerative braking control based on the inside information and the outside information by controlling a motor to recover braking energy based on a speed of the first vehicle, the status, and the distance.

10. The vehicle braking control apparatus of claim 9, wherein when executed by the processor, the instructions further cause the vehicle braking control apparatus to be configured to:
determine a driving intention based on the inside information, wherein the inside information comprises a status of an accelerator pedal of the first vehicle, a status of a brake pedal of the first vehicle, and a vehicle control status of the first vehicle;
determine a parameter based on the first information and the second information, wherein the parameter comprises at least one of a safe distance or a safe speed;
determine a target torque based on the parameter; and
further perform the regenerative braking by controlling, based on the target torque and the driving intention, a motor of the first vehicle to recover braking energy.

11. The vehicle braking control apparatus of claim 10, wherein when executed by the processor, the instructions further cause the vehicle braking control apparatus to be configured to:
determine a first distance based on the first information, wherein the first distance is a first relative distance between a first obstacle and the first vehicle, and wherein the first obstacle comprises a first moving object or a first static object;
determine a second distance based on the second information, wherein the second distance is a second relative distance between a second obstacle and the first vehicle, and wherein the second obstacle comprises a second moving object or a second static object; and
determine the safe distance based on the first distance and the second distance.

12. The vehicle braking control apparatus of claim 11, wherein when executed by the processor, the instructions further cause the vehicle braking control apparatus to be configured to:
obtain current location information of the first vehicle;
determine a current road scenario based on the current location information of the first vehicle;
determine a distance weight corresponding to the current road scenario based on a mapping relationship between the current road scenario and the distance weight; and
determine the safe distance based on the first distance, the second distance, and the distance weight.

13. The vehicle braking control apparatus of claim 10, wherein when executed by the processor, the instructions further cause the vehicle braking control apparatus to be configured to:
determine a first speed based on the first information, wherein the first speed is a first relative speed between a first obstacle and the first vehicle, and wherein the first obstacle comprises a first moving object or a first static object;
determine a second speed based on the second information, wherein the second speed is a second relative speed between a second obstacle and the first vehicle, and wherein the second obstacle comprises a second moving object or a second static object; and
determine the safe speed based on the first speed and the second speed.

14. The vehicle braking control apparatus of claim 13, wherein when executed by the processor, the instructions further cause the vehicle braking control apparatus to be configured to:
obtain current location information of the first vehicle;
determine a current road scenario based on the current location information of the first vehicle;
determine a speed weight corresponding to the current road scenario based on a mapping relationship between the current road scenario and the speed weight; and
determine the safe speed based on the first speed, the second speed, and the speed weight.

15. The vehicle braking control apparatus of claim 9, wherein the outside information comprises information of at least one of an environment, a road scenario, or an external vehicle.

16. The vehicle braking control apparatus of claim 9, wherein the second information comprises at least one of a road-allowed maximum speed, a road slope, a signal light status, a signal light distance, an average traffic speed of a current road, or a first congestion coefficient.

17. A computer program product comprising instructions that are stored on a computer-readable medium and that, when executed by a processor, cause a vehicle braking control apparatus to:
obtain inside information of a first vehicle;
obtain outside information of the first vehicle, wherein the outside information comprises first information from sensors on the first vehicle and second information from an internet of vehicles (IoV), wherein the second information comprises a status of a traffic light and a distance between the traffic light and the first vehicle; and
perform regenerative braking control based on the inside information and the outside information by controlling a motor to recover braking energy based on a speed of the vehicle, the status, and the distance.

18. A vehicle comprising:
one or more sensors configured to obtain first information; and
a processor coupled to the one or more sensors and configured to:
obtain inside information of a first vehicle;
obtain outside information of the first vehicle, wherein the outside information comprises the first information and second information from an internet of vehicles (IoV),
wherein the second information comprises a status of a traffic light and a distance between the traffic light and the first vehicle; and
perform regenerative braking control based on the inside information and the outside information by controlling a motor to recover braking energy based on a speed of the vehicle, the status, and the distance.

19. The vehicle of claim 18, wherein the outside information comprises information of at least one of an environment, a road scenario, or an external vehicle.

20. The vehicle of claim 18, wherein the second information comprises at least one of a road-allowed maximum speed, a road slope, a signal light status, a signal light distance, an average traffic speed of a current road, or a first congestion coefficient.

* * * * *

UNITED STATES PATENT AND TRADEMARK OFFICE
CERTIFICATE OF CORRECTION

Page 1 of 1

PATENT NO. : 11,919,422 B2
APPLICATION NO. : 17/673132
DATED : March 5, 2024
INVENTOR(S) : Zuqi Liu et al.

It is certified that error appears in the above-identified patent and that said Letters Patent is hereby corrected as shown below:

On the Title Page

Page 2, (56) References Cited, Foreign Patent Documents: "IN 104554279 A 4/2015" should read "CN 104554279 A 4/2015"

Signed and Sealed this
Seventh Day of May, 2024

Katherine Kelly Vidal
*Director of the United States Patent and Trademark Office*